United States Patent
Comaskey et al.

(10) Patent No.: US 6,914,926 B2
(45) Date of Patent: *Jul. 5, 2005

(54) HIGH AVERAGE POWER LASER GAIN MEDIUM WITH LOW OPTICAL DISTORTION USING A TRANSVERSE FLOWING LIQUID HOST

(75) Inventors: Brian J. Comaskey, Walnut Creek, CA (US); Earl R. Ault, Livermore, CA (US); Thomas C. Kuklo, Oakdale, CA (US)

(73) Assignee: The Regents of the University of California, Oakland, CA (US)

( * ) Notice: Subject to any disclaimer, the term of this patent is extended or adjusted under 35 U.S.C. 154(b) by 110 days.

This patent is subject to a terminal disclaimer.

(21) Appl. No.: 10/452,667

(22) Filed: May 30, 2003

(65) Prior Publication Data

US 2003/0206568 A1 Nov. 6, 2003

Related U.S. Application Data

(63) Continuation-in-part of application No. 09/653,604, filed on Aug. 31, 2000, now Pat. No. 6,600,766.

(51) Int. Cl.[7] .............................. H01S 3/04; H01S 3/20; H01S 3/091; H01S 3/094
(52) U.S. Cl. .............................. 372/51; 372/54; 372/75; 372/34
(58) Field of Search ............................ 372/51, 53, 54, 372/75, 34

(56) References Cited

U.S. PATENT DOCUMENTS

| | | | | |
|---|---|---|---|---|
| 3,541,469 A | | 11/1970 | Schimitschek et al. | 331/94.5 |
| 3,631,361 A | * | 12/1971 | Blumenthal | 372/51 |
| 3,678,410 A | | 7/1972 | Kocher et al. | 331/94.5 |
| 3,717,825 A | * | 2/1973 | Gerlach | 372/54 |
| 3,740,665 A | * | 6/1973 | Itzkan | 372/53 |
| 3,745,484 A | * | 7/1973 | Caristi | 372/53 |
| 3,779,939 A | | 12/1973 | Schmitschek et al. | 252/301.4 |
| 3,810,040 A | * | 5/1974 | Martin et al. | 372/51 |
| 3,913,033 A | * | 10/1975 | Tuccio et al. | 372/53 |
| 3,931,594 A | | 1/1976 | Schafer | 331/94.5 |
| 4,364,015 A | * | 12/1982 | Drake et al. | 372/53 |
| 4,731,793 A | * | 3/1988 | Ukai et al. | 372/53 |
| 5,425,044 A | | 6/1995 | Schlie et al. | 372/55 |
| 6,339,608 B1 | * | 1/2002 | Ault | 372/51 |
| 6,438,151 B1 | * | 8/2002 | Ault et al. | 372/51 |
| 6,600,766 B1 | * | 7/2003 | Ault et al. | 372/51 |

* cited by examiner

Primary Examiner—Don Wong
Assistant Examiner—Hung Tran Vy
(74) Attorney, Agent, or Firm—Eddie E. Scott; Alan H. Thompson

(57) ABSTRACT

A high average power, low optical distortion laser gain media is based on a flowing liquid media. A diode laser pumping device with tailored irradiance excites the laser active atom, ion or molecule within the liquid media. A laser active component of the liquid media exhibits energy storage times longer than or comparable to the thermal optical response time of the liquid. A circulation system that provides a closed loop for mixing and circulating the lasing liquid into and out of the optical cavity includes a pump, a diffuser, and a heat exchanger. A liquid flow gain cell includes flow straighteners and flow channel compression.

9 Claims, 5 Drawing Sheets

HIGH AVERAGE POWER LASER GAIN MEDIUM WITH LOW OPTICAL DISTORTION USING A TRANSVERSE FLOWING LIQUID HOST

CROSS-REFERENCE TO RELATED APPLICATIONS

This application is a Continuation-in-Part of U.S. patent application Ser. No. 09/653,604 now U.S. Pat. No. 6,600,766 filed Aug. 31, 2000 titled, "High Average Power Laser Using a Transverse Flowing Liquid Host," which is incorporated herein by this reference.

The United States Government has rights in this invention pursuant to Contract No. W-7405-ENG-48 between the United States Department of Energy and the University of California for the operation of Lawrence Livermore National Laboratory.

BACKGROUND OF THE INVENTION

1. Field of Endeavor

The present invention relates to lasers, and more particularly to a laser gain medium system that provides high power with low optical distortion.

2. State of Technology

U.S. Pat. No. 3,717,825 to Carl Zeiss-Stiftung, Wuerttemburg, Federal Republic of Germany, patented Feb. 20, 1973 shows and describes a liquid laser. This patent shows a dyestuff laser provided with a liquid guiding chamber through which circulates a cooled laser liquid. The laser is provided with a U-shaped laser active zone formed by a light transmitting longitudinal cap into which extends a tongue forming in said cap a U-shaped zone of uniform cross section. This U-shaped laser active zone is disposed in a focal line of an elliptically shaped pump light reflector while a source of pump light is disposed in the other focal line. The pump source was a flash lamp so that the liquid exchange was as much for the replacement of damaged dye as for the removal of optical disruption referred to as "streaking." Optical quality was not emphasized in this patent beyond the "streaking" comment.

U.S. Pat. No. 3,931,594 to Fritz Peter Schafer, assigned to Max-Planck-Gesellschaft zur Forderung der Wissenschaften e.V., patented Jan. 6, 1976, shows a transverse-flow cell for a laser. The cell of a liquid laser is defined between the rounded, parallel edges four coaxial cylinder sectors of fused quartz. The narrow gaps circumferentially bounded by the flat, converging side faces of the sectors provide conduits for rapid flow of dye liquid into and out of the cell which extend over the full axial length of the cell. The light of a flash tube is directed toward the cell through the cylindrically arcuate outer face of each sector. This patent described a transversely flowed liquid dye cell. It was also flash lamp pumped. Transverse flowing is the fast way to replace liquid volumes in long gain path length designs. This allows higher repetition rates than axial flow devices.

It is known that flash lamps have pulse widths of hundreds of microseconds to milliseconds. This means that the dye liquid solvent can respond to the heat being deposited into it by the pumping. It is widely understood that under such circumstances, there is an increasing degradation in the optical quality of the gain over the time of the pump pulse. This problem is common with the class of liquid laser media under consideration in this present patent for the same physical reasons. In fact in the last 30 years, no significant progress with this other class of liquid media has occurred because of this understanding.

In terms of low optical distortion of the lasing media, volume replacement flowing works well when the media is optically pumped by a pulsed laser whose pulse width is approximately 100 ns or shorter. With such short times, the dye solvent media can not respond to the deposited heat to manifest local changes in density and hence, optical path. This is not, however, a sufficient condition for good optical quality of the lasing media while lasing. If the lasing occurs at a time significantly later than the pulsed pumping event, than the lasing light will see evolving thermal optical distortions. In current liquid laser practice, dye lasers, this does not occur because liquid dye laser media exhibit energy storage times much shorter than the evolution time of thermal optical distortions. Typically dyes have storage times of only 1 ns or less. This means that dye lasers only lase while the pulsed pump is on. Nanosecond class pulsed pumping and very short storage times are good for obtaining low optical distortions in flowed liquid dyes lasers but largely rules out the use of highly efficient laser diode as a pump source. Note that the current patent accesses diode pumping by choice of another liquid media whose energy storage time is orders of magnitudes longer that the solvent's thermal optical response time. Hence the thermal optical problems to be addressed with flowing liquids in the current patent are physically different than those addressed by flowing pulsed pump dyes. Most current liquid dye laser devices are systems with such pulsed laser optical pumps.

U.S. Pat. No. 3,678,410 to Robert C. Kocher, Franklin K. Moore, Harold Samelson, and William R. Watson, assigned to GTE Laboratories Incorporated, patented Jul. 18, 1972 shows a transverse flowing liquid laser. A laser cell for a transverse flow liquid laser has an active region in the form of a rectangular prism and cylindrical input and output chambers mounted in spaced-apart relationship in the transverse direction at opposite ends of the active region. A baffle positioned in the input chamber causes the liquid to flow uniformly through the active region. This patent addresses the issue of proper mixing of the liquid prior to passing into the pumped region through the use of diffusers followed by flow channel compression. These transverse flow features are also incorporated into practical implementations of devices built using the concepts of the current patent. The Kocher patent does not limit itself to dye lasers but speaks generally of liquid lasers. However, the application of transverse flow is directed at pulse pumped lasers wherein good optical quality during lasing is achieved simply by insuring thermal uniformity of the liquid just before the start of pumping: "Optical distortion of the output beam may be prevented by insuring that isothermal conditions exist in the cell prior to excitation." This is the same physics as that of the current state of the art for pulsed laser pumped dye lasers and hence differs greatly from the circumstances of the current patent.

U.S. Pat. No. 3,740,665 to Irving Itzkan, assigned to Avco Corporation, patented Jun. 19, 1973 shows a transverse flowing liquid laser. Stimulated emission of radiation (laser action) is produced in materials generally classed as dyes. These dyes are dissolved in a liquid solution. A quantity of dye in a flowing liquid solution in a module or cavity is pumped or excited by a laser beam radiating in the ultraviolet region which is focused to a line with a cylindrical lens. A rectangular cross sectional beam of such radiation is produced by a pulsed crossed field nitrogen gas laser. The focused line which is transverse to the beam produced by the exciting laser, and transverse to the direction of the flowing dye lies near the surface of the dye material in the cell, and is substantially as long as the cell is wide. The cell lies within an intensifying optical cavity which may be formed by a 100 percent reflecting mirror and a partially reflecting mirror both perpendicular to the line of focus of the pumping radiation. The stimulated emission from the dye material is characterized by a short pulse width and a little loss of energy between the two lasers.

SUMMARY OF THE INVENTION

Features and advantages of the present invention will become apparent from the following description. Applicants are providing this description, which includes drawings and examples of specific embodiments, to give a broad representation of the invention. Various changes and modifications within the spirit and scope of the invention will become apparent to those skilled in the art from this description and by practice of the invention. The scope of the invention is not intended to be limited to the particular forms disclosed and the invention covers all modifications, equivalents, and alternatives falling within the spirit and scope of the invention as defined by the claims.

The present invention provides a laser gain media system comprising a lasing chamber or laser amplifier, and a conductor pumping device within said lasing or amplifier chamber. An arrangement of the semiconductor pumping device is that the optical pump irradiance along the liquid flow direction is approximately uniform. An arrangement of the semiconductor pumping device is such that optical pump irradiance across the liquid gain medium orthogonal to both the flow and the liquid medium's lasing is approximately uniform. An arrangement is such that wherein the optically pumped liquid gain medium's spatial cross section normal to it's lasing direction is rectilinear in shape. In one embodiment a flowing liquid host containing a lasing active atoms or molecules whose energy storage time is comparable to or greater than the hosts characteristic thermal optical response time to heat impulses. In one embodiment a circulation system circulates the lasing liquid into and out of the lasing chamber transversely to the lasing direction. In one embodiment a diffusion or mixing device in the circulation system to make the circulator input to lasing chamber thermally uniform. In one embodiment a flow straightening device and flow channel compression to give near uniform flow in lasing chamber.

Additional aspects, advantages, and features of the invention are set forth in part in the following description. Various aspects, advantages, and features of the invention will become apparent to those skilled in the art upon examination of the description and by practice of the invention.

DETAILED DESCRIPTION OF THE INVENTION

Figure 1:
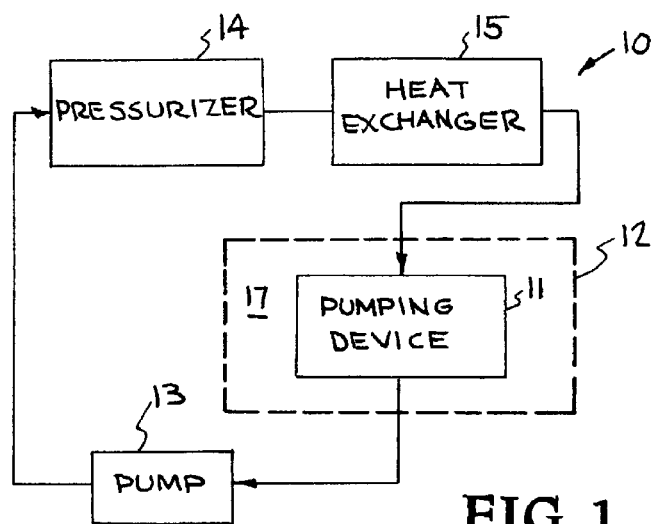
FIG. 1 is a flow diagram that illustrates an embodiment of a laser constructed in accordance with the present invention.

There are many applications for very high average optical power lasers at near infrared, or shorter wavelengths. These applications include power beaming, laser guide stars, illuminators, material processing, and weapons. In power beaming, laser radiation is transported to a remote location where it is converted to electrical power or used for other uses such as propulsion. Tens to hundreds of kilowatts of laser light with sufficient beam quality are required for the missions of interest. The wavelength requirements of the receiver as well as the transparency of the atmosphere are prime considerations.

A problem in high power applications that has been encountered is the lack of suitable sources of radiation with high beam quality. For weapons applications the Chemical Oxygen Iodine Laser (COIL) seems to show promise, but it is a complex and expensive system for use in the 10–100 kW regime. Also at 1.3 micron, it is not useful for use with solar cells and is not readily frequency converted to short wavelengths as would be required for guide stars.

Free electron lasers (FELs) have been touted as a solution for decades, but have failed to demonstrate useful output powers and acceptable system efficiencies at the wavelengths of interest. Proposed high efficiency recirculating FELs, in which the beam energy is recovered after exiting the wiggler, have been unimpressive due to the poor emittance of the recovered beam and the resulting energy loss in the accelerator and storage ring. To date FELs have yet to produce multi-kilo watt beams at any wavelength and require an immense physical plant to produce even a few watts in the infrared.

Neodymium and other metal ions embedded in a variety of glassy and crystal hosts have been the mainstay of commercial lasers and fusion lasers for decades. However, when these devices are applied to multi-kilowatt applications results have been disappointing. Despite of the development of many complex and expensive systems, practical operation at much greater than one kilowatt with beams near the diffraction limit has not been demonstrated. This complex problem is essentially an issue of thermal management. Solids must have the heat conducted away and at high heat loads this leads to unavoidable temperature gradients. These gradients destroy optical beam quality and can lead to fracture of the media. To cope with these problems designs have recently been put forward that use reduced crystal thickness to improve heat conduction. This approach has limited excited volume and a complex optical train must be constructed to give the volume needed to produce high average powers. It is not clear if closure can be reached with these designs since each added component adds additional optical aberrations and opportunities for catastrophic optical damage.

Fluids, on the other hand, have the advantage that when the media gets hot it can be removed from the optical path to a place where it can be cooled. There is a large body of patents and proven devices using liquid dye as the gain media and total fluid replacement between pumping and lasing events in order to provide improved optical quality in the lasing media. Note that this present patent has as a key component, the choice of flowing liquid media also, but differs radically from the common practice of liquid dye lasers in the relationship between pumping time and flow rate. This is driven by a fundamentally different relationship between the energy storage time of the gain media of choice and it's characteristic optical response time to thermal perturbations.

One of the most highly developed fluid lasers is the AVLIS dye laser AVLIS (Atomic Vapor Laser Isotope Separation). Development of this family of lasers took place at Lawrence Livermore National Laboratory over the period of 1972 to 1999. It can produce single aperture powers approaching 3 kW with nearly diffraction limited beams. However, these lasers do not store optical energy and must be excited by an even higher peak power pump laser, albeit with much lower beam quality requirements. Rare earth ion based lasers have the advantage of long florescent lifetimes so they require lower peak pump powers. The present invention uses a fluid host for a rare earth ion to get the advantages of a fluid that stores optical energy.

Liquid hosts containing rare earth have been demonstrated. However, such devices were built as large pulse energy devices, not average power devices and were flash lamp driven leading to unacceptably large temperature gradients in the fluid and their poor beam quality. U.S. Pat. No. 3,931,594 to Erhard J. Schmitschek, assigned The United States of America as represented by the Secretary of the Navy, patented Dec. 18, 1973, shows a liquid lasing composition consisting essentially of neodymium (III) phosphorus dichloridate, retained in solution with phosphorus oxychloride by the addition of a Lewis acid. A liquid lasing solution is prepared by introducing neodymium trifluoroacetate into phosphorus oxychloride. Some Lewis acid is also desirably included in the solution in an amount increase solubility of the neodymium III phosphorus formed, optimize the intensity of fluorescense of the liquid solution and enhance its operative efficiency. Preferably, Lewis of the form zirconium tetrachloride is employed and the neodymium (III) phosphorus dichloridate formed as a result of the dissolution of the neodymium trifluoroacetate in the phosphorus oxychloride is in a mole proportionality relative to the zirconium tetrachloride of not less than 1. The liquid laser solution is highly stable over relatively long periods of time, does not degrade under flash excitation, and obviates certain undesirable absorption characteristics of comparable prior art liquid lasing compositions. Most examples of this solvent system or similar solvent systems were demonstrated in static liquid cells but a few examples exist of liquid flowing systems. These systems were built along the principles of the early dye lasers, having axial flow hence capable of only low repetition rates. Even in these systems beam quality was found to be very poor given the long pulsed pumping times of the flash lamp pumps.

In the solid state laser field, diode laser based optical pumping of the gain media has become extremely popular in both experimental and commercial devices. Laser diodes offers good electrical to optical efficiencies and extremely high utilization in optical pumping of gain media (see chapter 6, W. Koechner, *Solid-State laser Engineering, fifth edition, Springer*). Laser diodes can be spectrally selected to minimize the energy defect of optical pumping of laser gain media resulting in reduced thermal loads on the gain media compared to other pumping methods. The ruggedness and long operational life of these semiconductor devices further enhance the desirability of this form of pumping. Laser diodes do not have the extremely high peak power characteristics of many lasers used in laser pumped laser designs. To put useful energy into a gain media, temporally the diodes operate close to the characteristics of either flash lamps (quasi-cw laser diodes) or arc lamps (cw laser diodes). As a result, the applicability of laser diode optical pumping to the current state of the art liquid lasers, dye lasers, is extremely limited. The pumping times required to put significant energy into a pulsed dye system is long with respect to both the energy storage time of the dye and the thermal optical time constant of the media. Cw lasing of laser diode pumped dye requires very high concentration of the diode light, making power scaling difficult and thermal optical distortions large.

Referring now to the drawings, to the following detailed description, and to incorporated materials; detailed information about the invention is provided including the description of specific embodiments. The detailed description serves to explain the principles of the invention. The invention is susceptible to modifications and alternative forms. The invention is not limited to the particular forms disclosed. The invention covers all modifications, equivalents, and alternatives falling within the spirit and scope of the invention as defined by the claims.

It is an object of the present invention to provide a wall plug efficient laser gain system that will support high optical power operation with low optical distortion. Many features from the above discussed diverse laser systems and classes of lasers are combined in a unique fashion to address the distinct physical phenomena of our choice of gain media type in order to achieve the above goal.

1) The liquid state under high flow is selected as the laser gain media in order to take advantage of flow technology as well as the liquid state's general advantages. With a properly designed flow system the maximum optical distortion would be based only on the amount of energy deposited into the liquid during the brief passage through the optical pump and lasing region. In unflowed systems the distortions in steady state are set by a balance of media heat transport cooling and the heating processes which defines much longer times and puts conduction or convection processes directly within the lasing channel, resulting in thermal optical distortions. Further, fluids do not exhibit birefringence or thermally induced birefringence so all polarization options are available, have high optical damage thresholds and do not permanently damage if the threshold is exceeded. Compared to solid laser media fluids are quite inexpensive.

2) To minimize the heat load from optical pumping and to achieve state of the art wall plug efficiency, diode pumping of the activated lasing agent in the liquid is done by laser diode pumping. The wavelength of the laser diode is preferably set to the absorption band with the lowest energy defect with respect to the lasing wavelength. Note, however, that neither pulsed nor cw laser diodes offer the level of power as the peak power of a typical pulsed pump laser for dyes lasers. Pulsed and obviously cw diode pumping puts energy into a laser gain media by operating for longer times than the pulsed pump laser and achieves high average powers by multiplying the number of laser diodes used.

3) In order to implement item 2 efficiently, the liquid state media must be activated by a lasing agent whose energy storage time is comparable to or longer than the liquids transit time across the optical pump zone. In other words, unlike the current state of art in flowed liquid lasers, liquid dyes, the energy storage times will be comparable or longer than the medias intrinsic characteristic time for the development of thermal optical distortions. This is physically a very different regime than the current flowed liquid state of the art systems, dye lasers. In the *CRC Handbook of Laser Science and Technology, Volume I*, two such liquid systems can be found, one based on chelates and the other based on aprotic liquids. To date the more successful liquid class has been the aprotic liquids with the best results found in the Nd3+ activator.

4) Contrary to the nearly single shot, very large pulse energy output goals and examples of all aprotic liquid based lasers to date, a high average power device is proposed through seeking much lower pulse energies (less heat load distortion per shot) but at very high repetition rates (~10 Khz). This drives the flow designs to hardware solutions similar to the flow diffused, flow straightened, and flow compressed high transverse flow designs that have been applied to liquid dye systems.

5) Such a flow solution as 4) has not been applied to such long energy storage liquid media to date due to the recognition that the physics of the optical distortions are different. Given the long pumping times compared to the response times of the solvent, thermally induced optical distortions will be present during lasing as opposed to pulsed laser pumped dyes. We make the key recognition, that with proper diode array conditioning, under highly conditioned transverse flow, the bulk of the optical distortion becomes the optically benign tilt. The proper laser diode array conditioning is defined for transverse pumping (orthogonal to both the liquid flow and the liquid's lasing axis) as approximate uniformity of irradiance along the flow direction and across the flow channel. For longitudinal pumping the conditioning goal is defined by a uniform rectilinear pump irradiance spatial cross section.

6) With long pulse or cw lasing, there will be a residual non-tilt aberration component in the gain liquid due to the heat deposited into the liquid from the lasing transition. For many applications, this reduced distortion is good enough. For the highest beam quality, as in the current state of the art (liquid dye lasers) the best optical quality of the gain media during lasing will be achieved by laser pulses that are shorter than the characteristic thermal optical response time of the liquid (~100 ns).

Referring now to FIG. 1, an embodiment of a laser constructed in accordance with the present invention is illustrated by a flow diagram. The laser system is generally designated by the reference numeral 10. A liquid lasing medium is circulated through a closed loop. The closed loop 16 is generally designated by the reference numeral 16. The closed loop circulates the lasing liquid into and out of a lasing chamber 17. A semiconductor pumping device 11 is located within the lasing chamber 17. The semiconductor pumping device 11 is used to optically excite the liquid lasing medium within the lasing chamber 17. The semiconductor pumping device can be a semiconductor diode laser or a light emitting diode. The pump 13, a pressurizer 14, and heat exchanger 15, circulate and condition the lasing liquid as it is circulated through the closed loop 16.

The geometry within the lasing chamber 12 is a straight flow channel with diode light incident on the fluid flowing through the channel. The laser system 10 provides a high power laser device that uses rare earth salts dissolved into aprotic liquids optically excited by a light emitting diode or semiconductor diode laser 11. The liquid lasing medium will now be described in greater detail.

When dissolved in a glass or crystal metal ions, especially rare earth ions, exhibit strong laser characteristics. When dissolved in water, or other hydrogen containing solvents, vibrational quenching severely reduces the upper excited state lifetime of these rare earth ions, making them unsuitable as a laser medium. This problem is solved by removing the hydrogen and using an aprotic solvent, for example selenium oxichloride. Work in this field has continued and focused on the oxichlorides of selenium and phosphorous as well the chlorides of tin, titanium, antimony, zinc, boron, and aluminum. A wide variety of rare earths dissolved in these aprotic solvents have been investigated. The best performance was seen for Neodymium. Inorganic liquid lasers based on Neodymium salts dissolved in aprotic acid solutions have been successfully demonstrated.

For power beaming applications it is desirable to operate a very high power cw or high repetition rate laser. High pulse energy, low shot rate applications are already well served by glass and crystal lasers. The discussion above illustrates the common problem of operating liquid host storage lasers in this mode. Dye lasers, when driven in the low pulse rate, high fluence mode, have poor performance for the same reasons.

Continuous Wave Power Oscillator Model—A solution to the steady state power oscillator in terms of system efficiencies and fundamental optical parameters is used, including the following:

$$P_{out} = \eta_{slope}(P_{in} - P_{TH}) \text{ and}$$

$$P_{TH} = (T+L)AI_{sat}/(\eta_{pump}\eta_{trans}\eta_{abs}\eta_{upper}\eta_{beam}),$$

where $P_{in}$ is the input electrical power to the pump source, $\eta_{slope}$ is the slope efficiency, $I_{sat}$, is the saturation intensity, and A is the cross sectional area of the gain media. The slope efficiency is a cascade of practical efficiencies and is defined by, $$\eta_{slope} = (T/(T-L))\eta_{pump}\eta_{trans}\eta_{abs}\eta_{upper}\eta_{beam}$$

$\eta_{pump}$ is the efficiency with which the pump source converts electricity into photons
$\eta_{trans}$ is the pump light transport efficiency
$\eta_{abs}$ is the absorption fraction of the pump energy
$\eta_{upper}$ is the product of the quantum efficiency and the pump to laser Stokes loss
$\eta_{beam}$ is the factor that accounts for the light distribution across the laser beam.
T and L are the output coupler and internal cavity losses.

Figure 2A:
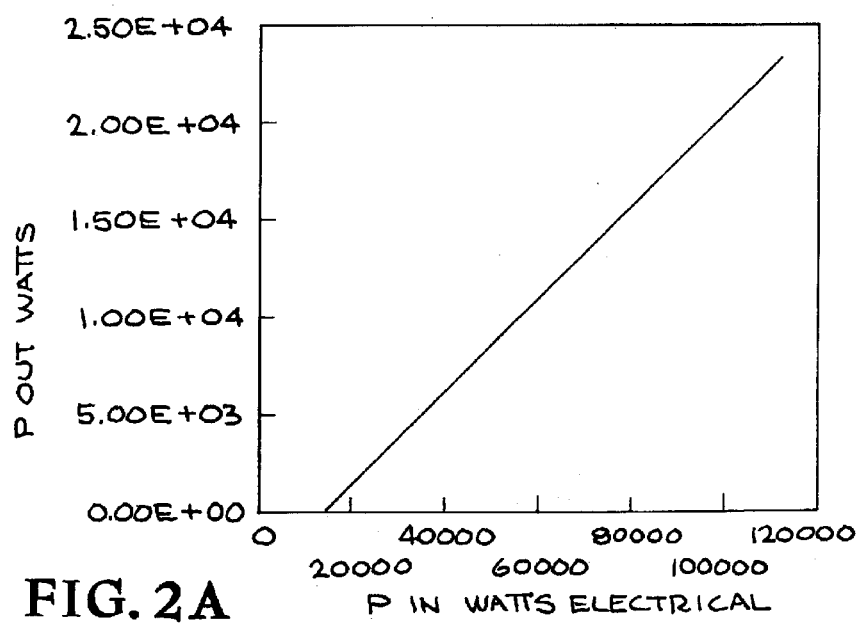
FIG. 2A is a graph of laser performance.
Figures 2B, 2C:
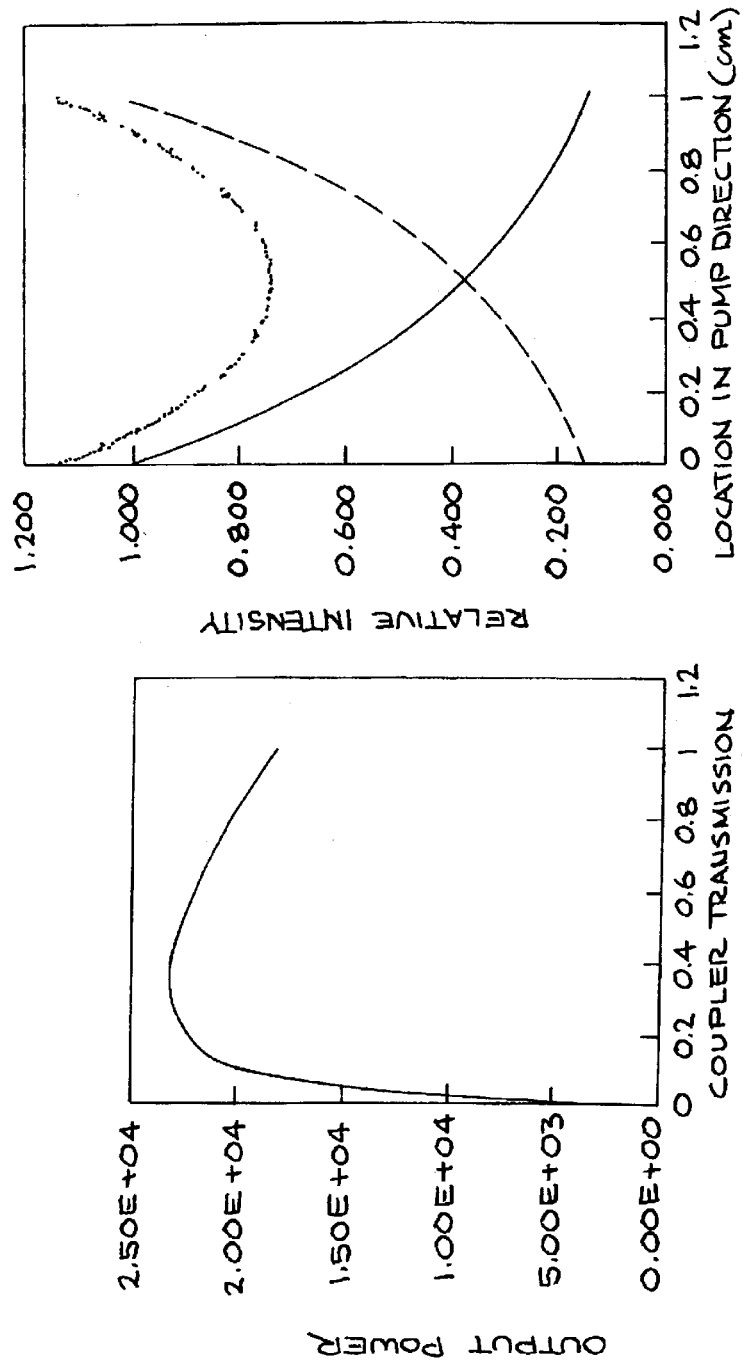
FIG. 2B is a graph of output coupler dependence.
FIG. 2C is a graph of relative pump light intensity.

Referring now to FIGS. 2A, 2B and 2C spread sheet models are shown that allows parameters to be varied using the above formulation. Power output and the dependence on the output coupler loss are shown. FIG. 2A shows laser performance, FIG. 2B shows output coupler dependence, and FIG. 2C shows relative pump light intensity. In addition to the pure laser performance, the hydraulic component of the fluid flows is presented. The larger dependence of the index of refraction on the temperature is an important consideration. A portion of the model developed deals with this issue in terms of the total optical path difference caused by heating the fluid.

A 20 kW power oscillator with an electrical to optical efficiency of 13% is presented. It is assumed that 880 nm laser diodes are used and that their light can be transported to the laser media at 90% efficiency. Better performance has been demonstrated in small lasers. The modest pump intensity of 590 watt/cm$^2$ can be obtained with microlensed 40 watt cw aluminum free bars with a pitch of 1.5 mm. Several manufacturers now offer similar products. Additional conditioning with fixed condensing lenses may be needed to improve transport efficiency and pump uniformity. Several systems were developed for transporting fiber delivered pump light to AVLIS dye lasers.

Since the pump light is incident on both sides of the flow channel, one must select an optical absorption depth that optimizes efficiency and beam uniformity. The model is calibrated in this respect using the data presented in the review article written by Weber (Handbook of Laser Science, CRC Press, 1982, page 411) where the molarity, $Nd^{+3}$ ion density, and optical depth are related. Resulting plots in FIGS. 2A, 2B and 2C show the pump intensity across the channel, the laser output as a function of the output coupler transmission, and the slope efficiency.

Table 1 (below) lists the flow parameters based on the Ingersoll-Rand Cameron Hydraulic Tables. We selected the data set for water like liquids forced through a nozzle. For a nozzle without an extreme aspect ratio we assume that an equivalent area of a round pipe is a good approximation to the 10:1 slit used. The table is based on a 3:1 diameter ratio between the feed pipe and the nozzle aperture. Under these assumptions, a very modest head of 33 psi is indicated to drive 1,015 gpm. The flow is most likely turbulent but based on our experience with dye laser design, the onset of turbulence can be delayed until the fluid reaches the diffuser section of the flow channel. As we learned in developing dye lasers, hydraulic design is as critical as laser design.

TABLE I 20 kW Power Oscillator Parameters

Laser Performance

| | |
|---|---|
| Maximum Output Power | 20,0004 watt |
| Maximum input electrical power | 158.400 watt |
| Diode optical power | 71,280 watt |
| Optical to optical efficiency | 28% |
| Electrical to optical efficiency | 13% |
| Output window loading | 25 kW/cm² |
| Gain length | 30 cm |
| Flow channel width | 1 cm |
| Flow channel height | 2 cm |

Hydraulic Performance

| | |
|---|---|
| Fluid flow | 1,015 gpm |
| Required head | 32.6 psi |
| Peak temperature rise | 0.39 C. |
| Clearing time | 0.93 msec |
| Equivalent repetition rate | 1071 Hz |

Figure 3A:
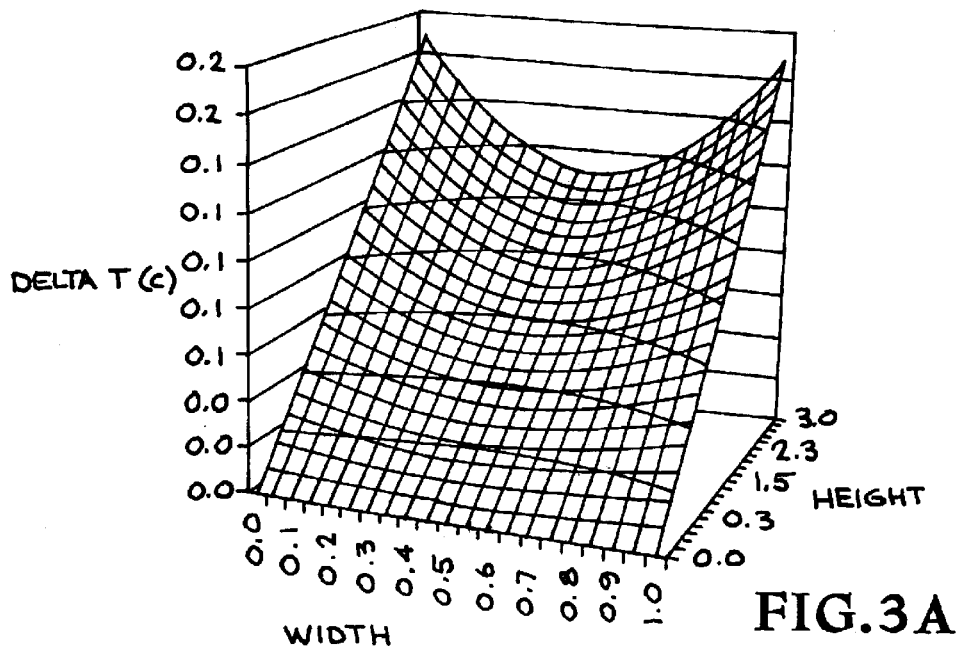
FIG. 3A is a contour plot showing temperature rise.
Figure 3B:
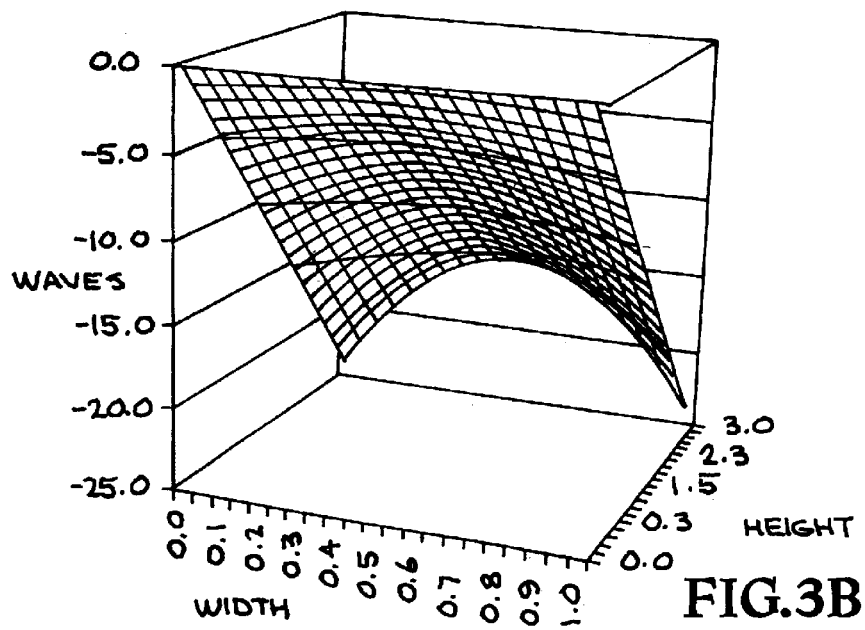
FIG. 3b is a contour plot showing single pass OPD.
Figure 3C:
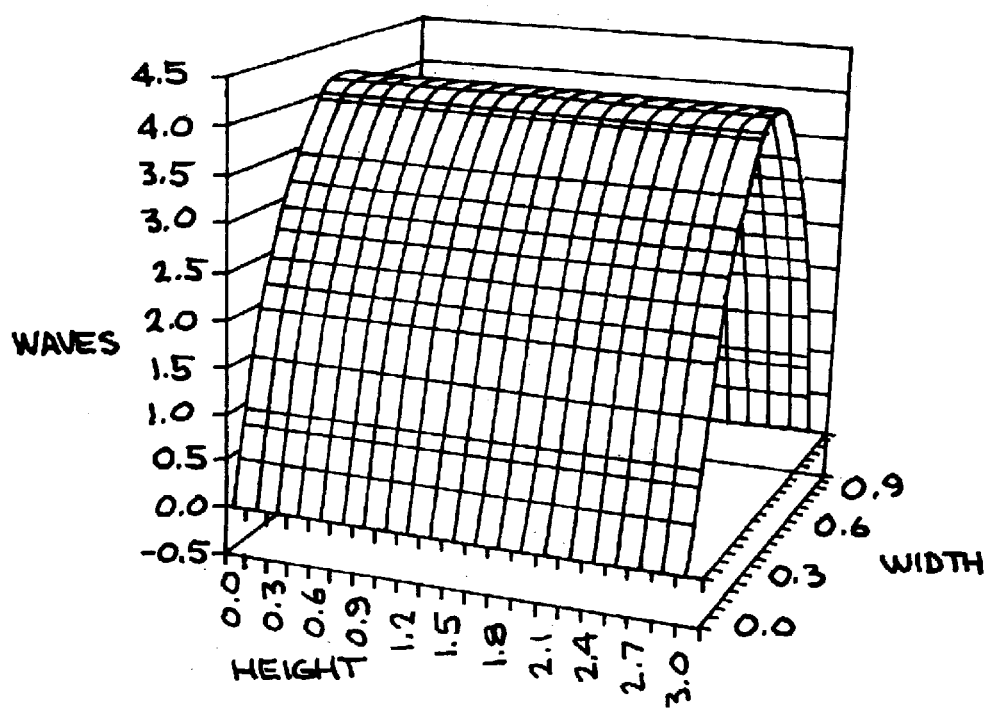
FIG. 3C is a contour plot showing double pass OPD.

To exercise the trade off between flow speed and temperature rise; we assume uniform pump illumination over the height of the gain volume that decays into the media by Beer's law and steady flow. Assuming no conductive heat transfer and negligible thermal expansion, the temperature rise of a given element of fluid can be shown to have the form $$\Delta T(x,y) = \alpha I_0(e^{-\alpha x} + e^{-\alpha(w-x)})y/(v_0 \rho c_p),$$

where $\alpha$ is the optical absorption depth in reciprocal centimeters, $I_0$ is the pump intensity incident on the windows, y is the distance the fluid has traveled at speed $v_0$, and $\rho c_p$ is the product of the mass density and specific heat. The x,y plane is oriented perpendicular to the laser direction. FIG. 3A shows a contour plot of the temperature rise over the cross section of the laser (x,y plane). The pump intensity has been reduced by (1-Optical:Optical efficiency) to account for the extracted laser light that is not left in the fluid as heat. As can be seen, the rise is less than 0.2 C maximum. However, with dn/dT being $-500 \times 10^{-6}$ (about 100 times that of glass) this will cause a significant optical path difference from the edge rays compared to the on-axis rays. This is estimated using $$OPD(x,y) = (GL/\lambda)(dn/dT)\Delta T(x,y),$$

where GL and $\lambda$ are the gain length and wavelength, both in cm. FIG. 3 also shows contour plots of OPD in the single pass, full length configuration and in the half length, double pass configuration. We see that the distortion is a simple wedge with some exponential component due to the Beer's law dependence of the pump absorbance. A simple way to deal with this steady distortion is to divide the gain into two sections having opposite flow directions and place both sections in the same cavity. The simple wedge in the plot shown in FIG. 3B, is reduced by half, GL/2, and cancels to about 4 waves of pure cylinder, as shown in the graph of FIG. 3C. This mild astigmatism should be easily to deal with since it is constant in time.

So far only Nd+3 has been discussed. Salts of the other rare earths also dissolve in aprotic solvents. Heller (J. Mole. Spec. 28, 228, (1968) reports the measured absorption and emission spectra for a number of rare earths. Other ion laser systems may be possible as well.

Depending on how short the emission wavelengths of power diode bars can be, there are likely metal ion systems that will hit the 800 to 900 nm range. High power bars down to 680 nm are likely to be commercially available in the future. This would allow us to gain a factor of two in solar cell peak efficiencies and have a significant impact on power beaming applications. Combined with second harmonic generation and sum frequency additions, a wide range of wavelengths could be accessible with the liquid laser technology.

Figure 4:
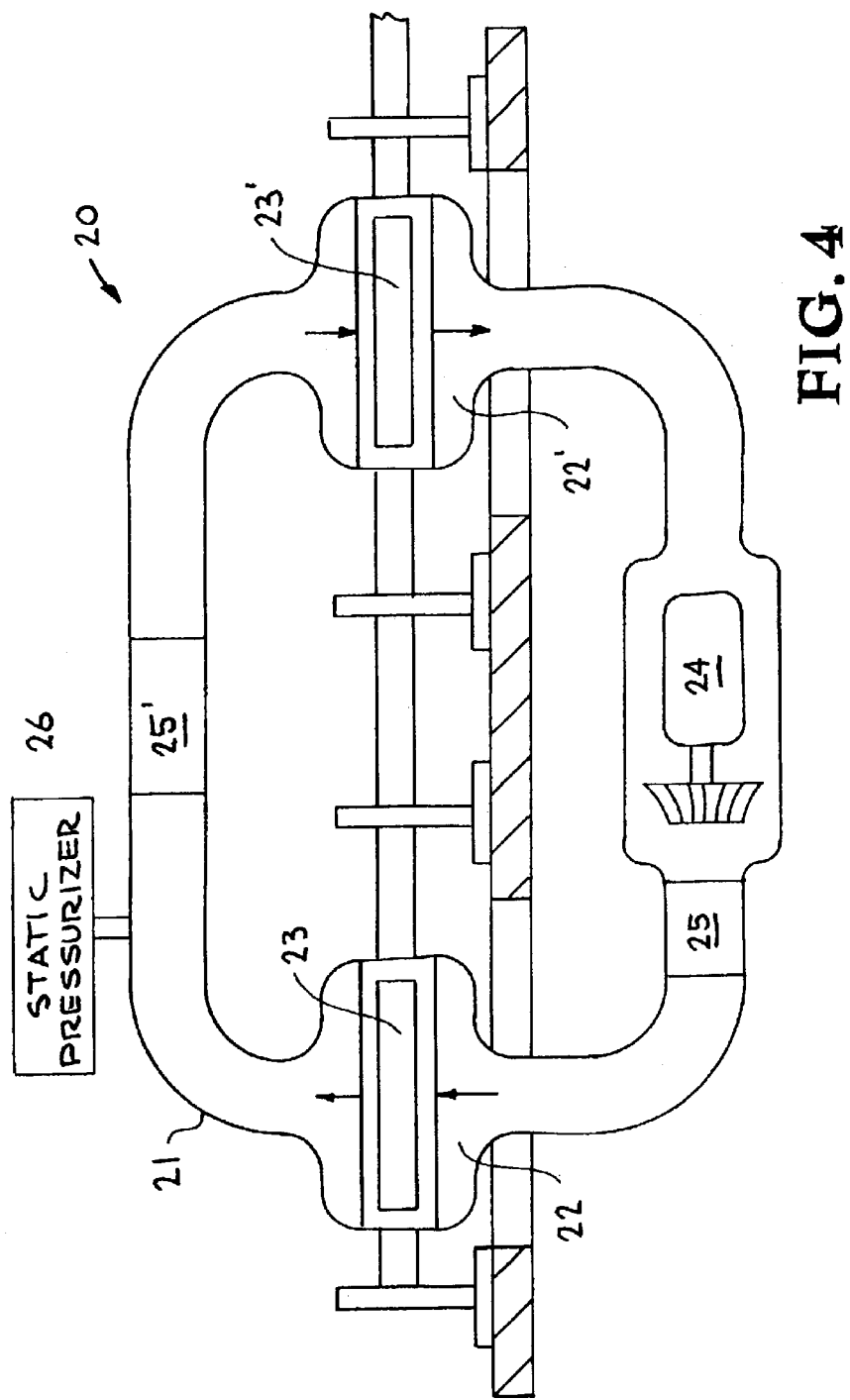
FIG. 4 illustrates a preferred embodiment of a laser constructed in accordance with the present invention.

Referring now to FIG. 4, a preferred embodiment of a laser constructed in accordance with the present invention is illustrated. The laser system is generally designated by the reference numeral 20. A liquid lasing medium is circulated through a closed loop. The closed loop is generally designated by the reference numeral 21. The closed loop 21, filled with aprotic solvent containing Nd+3 ions, circulates the lasing liquid into and out of a pair of lasing chambers 22 and 22'. A pair of semiconductor pumping devices 23 and 23' are located within the lasing chambers 22 and 22'. The semiconductor pumping devices 23 and 23' are used to optically excite the liquid lasing medium within the optical cavities, lasing chambers 22 and 22'. The semiconductor pumping devices 23 and 23' can be a semiconductor diode lasers or light emitting diodes. The pump 24 circulates the lasing liquid through a pair of heat exchangers/flow conditioners 25 and 25', a static pressurizer 26, and the optical cavities 22 and 22'.

The geometry within the lasing chambers 22 and 22' is a straight flow channel with diode light incident on the fluid flowing through the channel. The laser system 20 provides a high power laser device that uses rare earth salts dissolved into aprotic liquids optically excited by light emitting diodes or semiconductor diode lasers 23 and 23'.

Windows at each end of the channel define an excitation volume. Two gain blocks with opposite flow directions are used to compensate for the static optical wedge induced by fluid heating. The linear component, or optical wedge, that builds up in the liquid as it flows past the pump windows is predictable and steady. By arranging two cells in series in the laser cavity having opposite flow directions allows the wedge to be canceled. Alternatively, reverser optics could be introduced to fold the image of the active zone within the laser resonator much the same as a zig-zag path in a slab laser. Unlike conventional zig-zag geometry, the internal surface reflection needed to get the beam folded appropriately in not available because those surfaces are open to allow the fluid to flow. Internal reflection in the orthogonal direction has been used in liquid lasers to cancel the exponential or Beer's Law component but not the thermal wedge. The remaining phase distortion that does not cancel is nearly a perfect parabola and is proposed to be cancelled with a deformable mirror (DM) of the opposite parabolic curvature. All this requires a high degree of cancellation of the linear portion of the thermal distortion. It may turn out that the distortions are not steady enough for good cancellation, even with an actively adjustable parabolic mirror. The invention described here uses an error signal derived from wavefront errors to feed back to the power supplies driving the semiconductor diodes that excite the liquid laser medium (enclosed in two oppositely flowing fluid cells) introducing an electrically controllable wedge into the laser cavity. Nulling the wedge created by the thermal loading of the laser medium occurs in real time to affect a correction of the linear portion of the optical wedge.

One aspect of the present invention is to provide high average power not necessarily high fluence. Rather than pulse pump, the present invention will cw pump and extract the laser energy as a cw signal or to Q switch the laser to obtain short pulses. This eliminates the shock loading of the fluid by the sudden volume change caused by the waste pump energy. Instead the expansion is accommodated by a slight but steady shift in the fluid density. Cw operation also fits the preferred operating mode of semiconductor diodes and eliminates the need for expensive energy storage and switching circuitry. With adequate flow speed the second problem can be controlled, the rate of change of the index of refraction with increasing temperate, dn/dT. The result is a steady state optical wedge with a superimposed astigmatism over the pumped volume. The wedge can be compensated by passing the extraction beam through two cells having opposite flow directions. Remaining optical path errors will be steady at a given operating point and can be removed with static correction if needed. Techniques for dealing with non-uniform pump energy deposition include bounce beam fluid cells and counter propagation. These all rely on exposing the signal beam to various parts of the fluid volume to cancel aberrations. An additional feature of the liquid hosts is that their specific heat is nearly twice that of YAG and silicate glasses so that deposition of heat causes a smaller temperature rise. Phosphate glasses can have specific heats comparable to the liquids.

It remains to deal with dT that occurs if the laser is pulsed. When the gain is switched on (or when the oscillator pulse fills the cavity as in a Master Oscillator Power Amplifier) there is an almost instantaneous redistribution of heat in the fluid leading to variations in the index of refraction and the local volume of the fluid (dV/dT). However, unlike the problem that occurs on the time scale of the pump time (hundreds of microseconds) where there is time for sound to travel to the walls and for the fluid density to change, the time scale is that of the laser pulse (<200 nanoseconds). There is little time for the media to respond mechanically before the pulse is over. For a liquid, water for example, the speed of sound is 1450 m/sec. In 200 nsec sound will move 300 microns. By comparison, sound would travel about 30 cm during a 200 microsecond pump pulse. Managing the extraction pulse disturbance puts limits on the repetition rate and flow speed in order for new fluid to fill the cavity before the next extraction pulse. Acoustic damping may be included.

What is claimed is:

1. A laser gain media system, comprising:
   a lasing structure, said lasing structure including a first lasing chamber and a second lasing chamber,
   a flowing liquid host containing lasing active atoms or molecules whose energy storage time is comparable to or greater than the hosts characteristic thermal optical response time to heat impulses, said flowing liquid host having a lasing direction and a liquid flow direction,
   a circulation system for circulating said flowing liquid host into and out of said lasing structure transversely to said lasing direction,
   said circulation system comprising a closed loop for circulating said flowing liquid host through said first lasing chamber in a first linear direction and through said second lasing chamber in a second linear direction, wherein said first linear direction is opposite to said second linear direction,
   a semiconductor pumping device within said lasing structure, said semiconductor pumping device arranged such that the optical pump irradiance along said liquid flow direction is approximately uniform.

2. The laser gain media system of claim 1 wherein said lasing structure comprises a lasing chamber.

3. The laser gain media system of claim 1 wherein said lasing structure comprises a laser amplifier.

4. The laser gain media system of claim 1 including a diffusion device in the circulation system to make the circulator input to lasing chamber thermally uniform.

5. The laser gain media system of claim 1 including a mixing device in the circulation system to make the circulator input to lasing chamber thermally uniform.

6. The laser gain media system of claim 1 including a flow straightening device and flow channel compression to give near uniform flow in lasing chamber.

7. The laser gain media system of claim 1 wherein said semiconductor pumping device is arranged such that optical pump irradiance across the liquid gain medium orthogonal to both the flow and the liquid medium's lasing is approximately uniform.

8. The laser gain media system of claim 1 wherein said semiconductor pumping device is arranged such that the optically pumped liquid gain medium's spatial cross section normal to it's lasing direction is rectilinear in shape.

9. A laser gain media system, comprising:
   a lasing chamber or laser amplifier, said lasing chamber or lasing amplifier including a first optical cavity lasing chamber and a second optical cavity lasing chamber,
   a semiconductor pumping device within said lasing chamber or laser amplifier,
   an arrangement of said semiconductor pumping device such that the optical pump irradiance along the liquid flow direction is approximately uniform,
   an arrangement of said semiconductor pumping device such that optical pump irradiance across the liquid gain medium orthogonal to both the flow and the liquid medium's lasing is approximately uniform,
   an arrangement wherein the optically pumped liquid gain medium's spatial cross section normal to it's lasing direction is rectilinear in shape,
   a flowing liquid host containing a lasing active atoms or molecules whose energy storage time is comparable to or greater than the hosts characteristic thermal optical response time to heat impulses,
   a circulation system for circulating said lasing liquid into and out of said lasing chamber transversely to the lasing direction,
   said circulation system comprising a closed loop for circulating said flowing liquid host through said first lasing chamber in a first linear direction and through said second lasing chamber in a second linear direction, wherein said first linear direction is opposite to said second linear direction,
   a diffusion or mixing device in the circulation system to make the circulator input to said lasing chamber thermally uniform,
   a flow straightening device and flow channel compression to give near uniform flow in said lasing chamber.

* * * * *